Aug. 25, 1970
W. D. O'NEILL ET AL  3,525,565
OPTICAL STATUS TESTING MEANS AND METHOD FOR DYNAMICALLY
DETERMINING LENS ACCOMMODATION
Filed Jan. 29, 1968  3 Sheets-Sheet 1
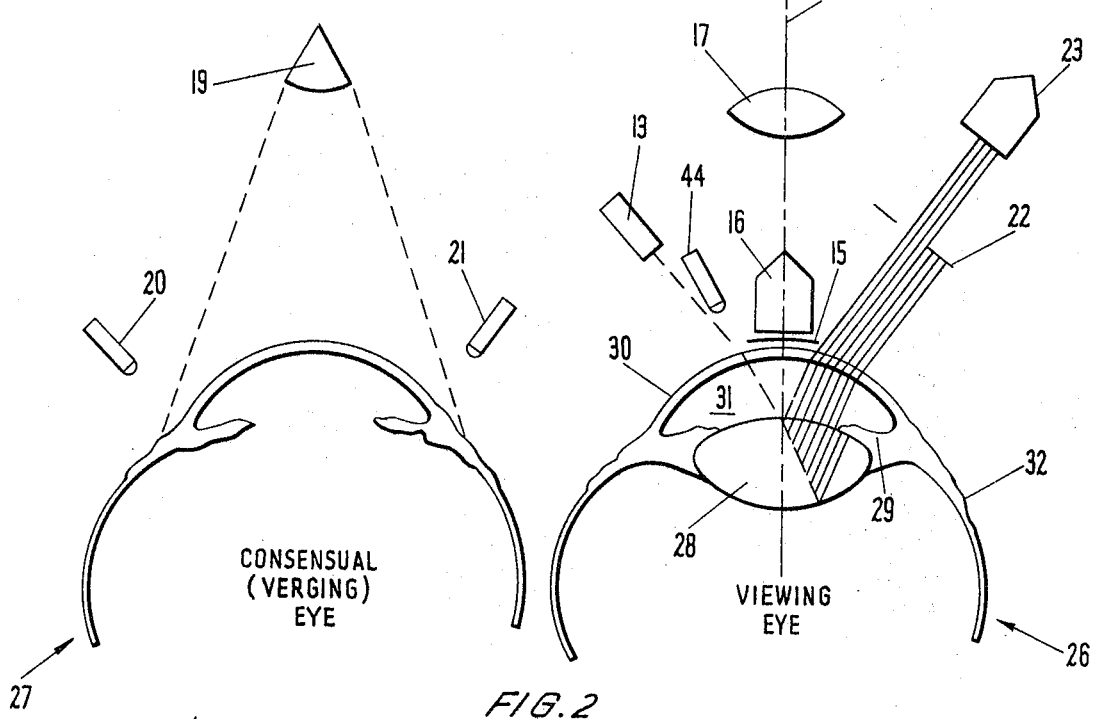
INVENTORS
WILLIAM D. O'NEILL, LAWRENCE STARK
+ ANNE TROELSTRA
BY
Wolf, Greenfield & Hicken INVENTORS
WILLIAM D O'NEILL, LAWRENCE STARK
& ANNE TROELSTRA
BY
Wolf, Greenfield & Hieken

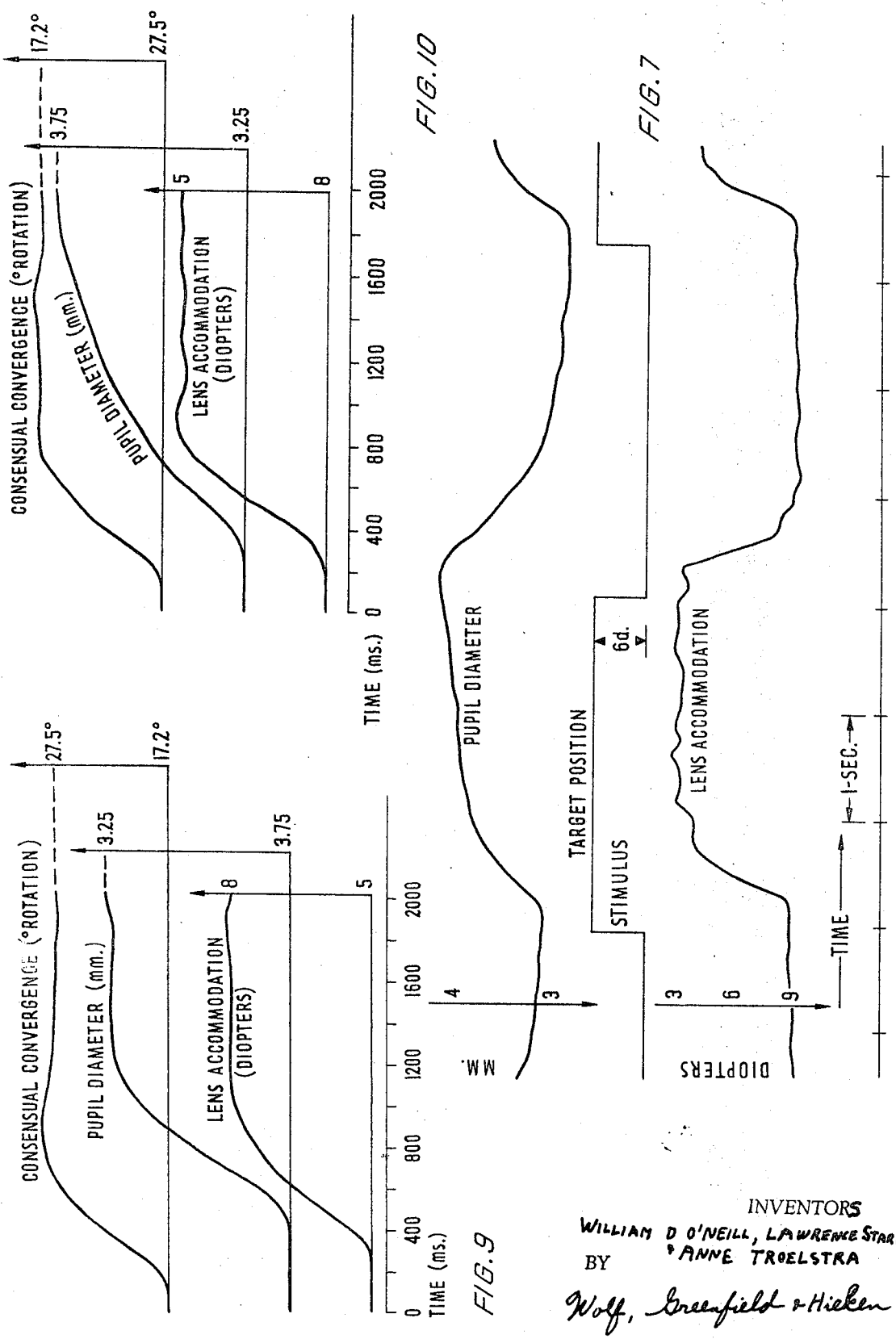

3,525,565
Patented Aug. 25, 1970

3,525,565
OPTICAL STATUS TESTING MEANS AND METHOD FOR DYNAMICALLY DETERMINING LENS ACCOMMODATION
William D. O'Neill, Thinsdale, and Lawrence Stark and Anne Troelstra, Chicago, Ill., assignors to Whittaker Corporation, Los Angeles, Calif., a corporation of California
Filed Jan. 29, 1968, Ser. No. 701,155
Int. Cl. A61b *3/10, 3/00, 3/14*
U.S. Cl. 351—6      21 Claims

ABSTRACT OF THE DISCLOSURE

An optical status testing means and method for dynamically and statically determining lens displacement and deformation, i.e., lens accommodation, eye position, pupil diameter and accommodative vergence in human or animal subjects in response to optical axis accommodative stimulation. The method includes positioning a target on the optical axis of one eye of an individual, directing a slit beam of light onto the front surface of the leans of the eye while the eye is focused on the target which may be moving, and determining the amount of light reflected from the front surface and interior of the leans which is indicative of lens accommodation in response to the target stimulus. Preferably reflection of light from the cornea of the eye is monitored through a variable density filter to obtain a correction in reflected light from the lens due to movement of the eye in a horizontal plane. Preferably the method further includes determining light reflection from the iris to determine pupil diameter simultaneously with the determination of eye accommodation. Light reflection in the consensual eye from a second light source is measured to determine the degree of rotation of the consensual eye simultaneously with the preceding monitoring steps to obtain accommodative vergence. All responses are preferably measured in real time as by a chart recorder to permit comparison. The optical status testing means preferably comprises a slit beam of infrared light directed to the eye in conjunction with a target positioned along the optical axis in front of the lens with the target being movable along the optical xais. The means for determining the reflection of light in the methods of this invention are preferably photosensitive devices such as photomultipliers and photodiodes.

BACKGROUND OF THE INVENTION

There have been many methods and instruments designed to record instantaneous lens accommodation, pupil diameter and accommodative convergence in response to a wide range of stimuli. In some cases, the methods and instruments were designed to record or monitor only one of the above factors such as lens accommodation. For the most part, such methods and instruments have met with limited or no acceptance in the commercial field due to a variety of factors. One of the most successful of the known methods and instruments for measuring instantaneous lens accommodation comprises the use of a diaphragm having two pinholes positioned in front of the eye of a test subject. However, this device is highly complicated requiring elaborate, space consuming instrumentation. Trained test subjects must be used and there is a limitation in that the distance between the pinholes is limited by the diameter of the pupil.

The test results obtained by such prior art instruments and methods can give important indications of a subject's eye condition and may detect abnormalities. Dynamic accommodation, i.e., instantaneous accommodation to a moving target can be clinically important in determining visual and brain response time as well as lens accommodation time. Static accommodation, in response to a given stimulus is important for use in determining prescriptions for corrective eyeglasses. The accommodative vergence of the eyes of an individual is useful in determining such factors as the influence of drugs on the body of that individual as for example the alcohol level of the body of the individual.

SUMMARY OF THE INVENTION

The optical status testing means for determining eye accommodation comprises a means for directing a slit beam of light onto the front surface and interior of the lens of one eye of an individual which is considered the viewing eye. The slit beam is used in conjunction with a target mounted for movement along the optical axis of the viewing eye. A means is provided for determining reflection from the front lens surface and interior of the lens of the eye which means is light sensitive and may be a photomultiplier, photodiode, TV camera or any desired light sensitive detector. This reflection is a measurement of lens accommodation to target position. Preferably a second light sensitive means is mounted to determine reflection from the cornea. The second light sensitive means is mounted behind a filter which has variable density from side to side so that movement of the eye, in horizontal positions, from the optical axis can be determined by the response of the light sensitive means to reflected light from the cornea passing through different portions of the filter. This reflection is used to detect and correct errors in the measurement of lens accommodation which may be necessary due to artifacts produced by horizontal movement of the eye. Preferably another light sensitive detector is positioned to monitor the length of reflection from the pupil margin to the sclera, i.e., iris width, to give an indicative of pupil diameter. The above means are used in conjunction with the viewing eye while the second or consensual eye of the individual is preferably tested simultaneously with the first eye by light sensitive detectors and a second light source, to determine rotation of the consensual eye in a horizontal plane in response to the targe mentioned above.

The means described above thus measures lens accommodation and pupil diameter in a stimulated or viewing eye which has been stimulated by a target moving along the optical axis of that eye and also measures accommodative vergence in the consensual eye. The measurements can be made dynamically, i.e., while the target is moving and the responses are taking place in the eyes in response to optical axis accommodative stimuli. Preferably infrared light is used for the slit beam light source to insure comfort to the subject and to minimize interference with detecting the target which is the accommodative stimulus.

All of the light sensitive detecting means produce electrical responses which are preferably electrically low pass filtered to at least 30 cycles per second to eliminate unwanted inherent photomultiplier and photodiode noise.

Preferably the target moves along the optical axis of the viewing eye and a supplementary lens is positioned on the axis between the target and the eye.

System sensitivities of 0.15 diopter, 0.01 mm. and 0.1 degree for lens power, pupil diameter and consensual vergence measurements respectively can be easily obtained. All responses of the light sensitive detectors are measured simultaneously in real time to permit ease of comparison and coordination with each other.

According to the method of this invention, eye accommodation and related data is obtained by positioning a target on the optical axis of one eye of a test subject and directing a slit beam of light onto the front of the eye while the eye is focused on the target. The amount of light reflected from the front surface and interior of the lens is determined and gives an indication of eye accommodation to the distance of the target from the viewing lens along the optical axis. The target is preferably moved to give a series of instantaneous determinations of lens accommodation. Preferably light reflected from the cornea is simultaneously passed through a variable density filter to obtain a correction in reflected light due to movement of the eye in a horizontal plane. In addition, it is preferred to simultaneously measure the pupil diameter by reflection of light from the iris. The second or consensual eye of the individual is also monitored with a light sensitive detector means as will be described simultaneously with the steps set forth above, to determine horizontal rotation of the consensual eye in response to the target and movement thereof.

BRIEF DESCRIPTION OF THE DRAWINGS

The above and other features and advantages of the present invention will be better understood from the following specification when read in connection with the accompanying drawings in which:

FIG. 1 is a diagrammatic showing of an optical status tester in accordance with a preferred embodiment of this invention;

FIG. 1A is a diagrammatic showing of a chart recorder used in conjunction with the apparatus of FIG. 1;

FIG. 2 is a diagrammatic view of the operation thereof;

FIG. 3 is a front view of a viewing eye indicating the reflection of light therefrom in accordance with this invention;

FIG. 7 is a graph showing pupillary and accommodative responses to a square wave change in stimulus diopters;

FIGS. 9 and 10 are graphs of a study of the three physical systems measured by the means and methods of this invention.

DESCRIPTION OF PREFERRED EMBODIMENTS

Figure 8:
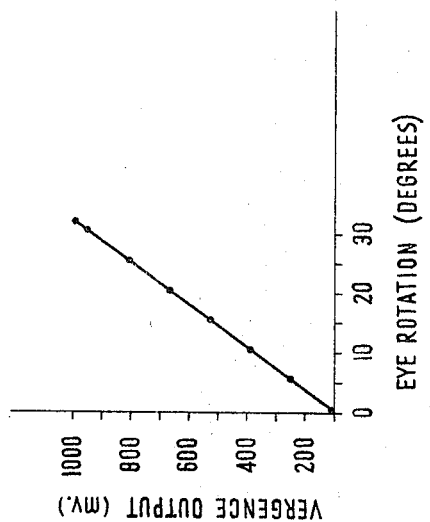
FIG. 8 is a graph showing a calibration curve for the consensual vergence detector.

With reference now to the drawings, a preferred embodiment of the optical status testing instrument of this invention is diagrammatically illustrated in FIG. 1 at 10 and comprises a base 11 carrying a binocular microscope 12 and a slit lamp light source 13 mounted so that the microscope and illumination can swing together in focus on an eye about 360° along the horizontal plane. A Bausch & Lomb Thorpe Slit Lamp of conventional design long known in the art is used as the instrument 10 with the target, light sensitive detectors and a second light source incorporated thereon. On the conventional Bausch & Lomb Thorpe Slit Lamp is mounted a filter 14 to filter the light source from the slit lamp 13 as will be described. A varying density filter 15 is positioned in front of a photomultiplier 16 on a support extending upwardly from the base 11. Also extending upwardly from the base is a support for a lens 17 aligned with a target 18' adapted to be aligned with the optical axis of a viewing eye to be tested. A second infra-red light source 19 is mounted preferably equidistant between a pair of light sensitive diodes 20 and 21 which are adapted to be directed toward the consensual eye of an individual to be tested. A diaphragm 22 is interposed between one barrel end of the binocular microscope 12 and a photomultiplier 23. A photodiode 44 is mounted on another support of the base 11. The photomultiplier 23, photomultiplier 16 and photodiodes 20, 21 and 44 have electrical leads not shown for connection to conventional operational amplifiers and finally to a multi-channel chart recorder 24.

The Bausch & Lomb Thorpe Slit Lamp used in the preferred embodiment can be substituted by other conventional mechanical bases, slit lamp sources and optical systems. The filter 14 is readily available for changing the slit beam light source from visible light to infra-red light and the 12.5× magnification provided in the interchangeable eye pieces of the microscope 12 is suitable for use in the specific embodiment of this invention. Preferably the slit beam of light at the eye has a length of 11 millimeters and a width of ½ millimeter so that it illuminates the vertical extent of the iris and covers a portion of the width of the pupil as shown in FIGS. 2 and 3. The length of the slit may vary although it is preferably at least 11 millimeters. The width of the slit can vary between 0.1 and 3 millimeters. The length and width are not significant although the width is preferably maintained at a minimum, approximately 0.5 millimeter, to increase sensitivity and resolution of the image.

Turning now to FIGS. 2 and 3, the optical status tester is shown diagrammatically in its operative position with respect to a viewing eye 26 and a corresponding verging or consensual eye 27 of a human individual test subject. Each eye has the conventional human anatomy of a lens 28, iris 29, cornea 30, aqueous fluid 31, sclera 32 and pupil 33.

The slit lamp light source 13 directs a beam of visible or infra-red light to the lens and iris of the eye. A portion of the light is reflected as shown in FIG. 3 at 40, with portion 41 being the significant portion for measurement of accommodation of the eye lens, i.e., increase or decrease in lens curvature as well as movement in position of the eye lens forward or rearward along the optical axis. The beam of light used is preferably visible light until the beam can be properly located as shown in FIG. 3, whereupon filter 14 is positioned between the light source and the viewing eye to obtain a beam of infrared light. Infra-red light used can be at any wavelength in the near infra-red spectrum but is preferably at a wavelength of from 7000 Å. to 9000 Å. so that the light is compatible with maximum photomultiplier response and minimal retinal sensitivity of the eye.

The target is preferably a 2 millimeter cross driven on the optical axis 18 as by an x-y recorder although a manually moved target can be used. The target is preferably viewed through a 10 diopter viewing lens 17 placed on the subject's optical axis 10 centimeters from his cornea. In this way the target position in centimeters from the opposite focal point of the viewing lens is equal to diopters of stimulus presented to the subject by the position of the target.

Photomultiplier 23 is preferably an Amperex 150 CVP photomultiplier used to record the instantaneous curvature and position of the viewing eye lens and is fixed on one barrel defining one optical axis of the microscope with the field of that barrel of the microscope being limited by a 2 millimeter square aperture 22 placed in front of the microscope ocular. As indicated at FIG. 2, one-half of the square field is illuminated by the eye lens across section and the other half is dark. As the subject accommodates when the target is moved or when the target is fixed and the subject first accommodates on viewing the target, the square field is progressively filled by the eye lens cross section. The 2 millimeter iris 22 is sufficiently small so as to exclude the pupil from the field presented to the photomultiplier 23 at all levels of accommodation, so that one obtains only reflection from the eye lens. The photomultiplier anode current is read out on the strip chart recorder 24 which can be a multichannel Sandborn-Hewlett Packard recorder.

Preferably the slit lamp 13 is positioned approximately 8 centimeters from the cornea while the photomultiplier 23 is positioned approximately 1.5 centimeters behind the microscope 12. These distances may vary depending upon the light intensity and sensitivity of the photomultiplier detector 23. Preferably the slit beam illuminating area 41 is vertical since the slit lamp source and photomultiplier 23 are mounted substantially at the center of the vertical height of the eye with the subject's body vertical and the optical axis 18 horizontal.

Figure 5:
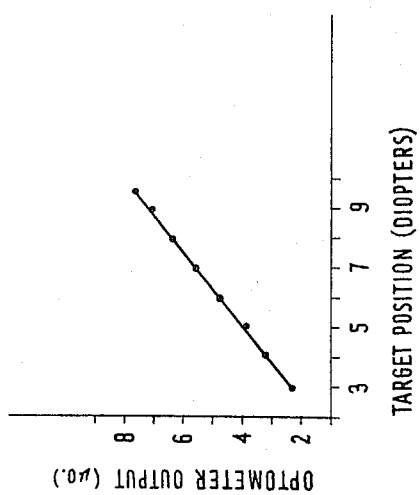
FIG. 5 indicates the subjective calibration curve of target position to optometer output.
Figure 4:
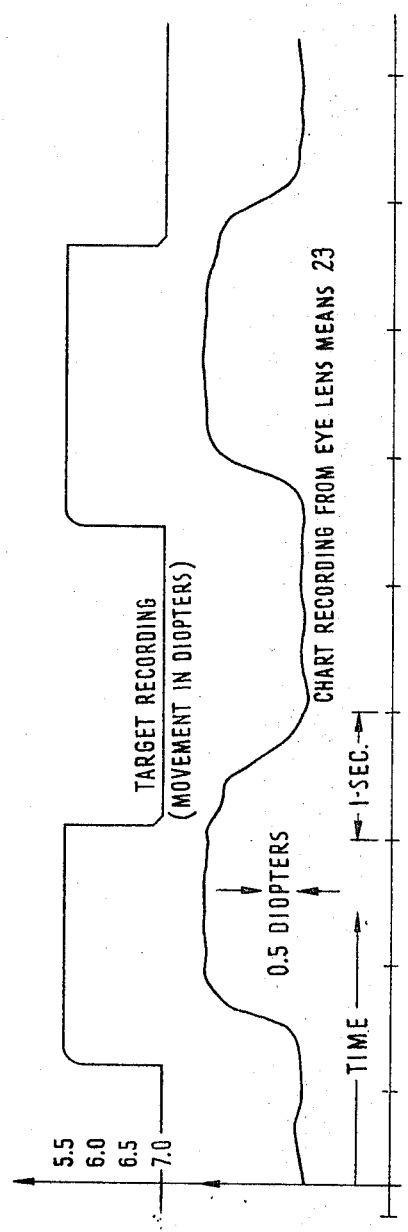
FIG. 4 is a graph showing a typical stimulus and response recording.

A typical target stimulus and response recording is shown in FIG. 4 where the target movement from 5.5 to 7.0 diopters is indicated where diopters are shown by the vertical line and time by the horizontal line on the graph. FIG. 5 indicates the subjective calibration curve of target position to optometer output for the optometer formed by photomultiplier 23, slit beam 13, the target and lens 17. The graph of FIG. 5 is obtained by requesting the subject to focus on the stimulus target for a series of known diopter stimuli (movement of the target between the far focal point of lens 17 and the surface of lens 17) while the electrical output of photomultiplier 23 is monitored by the strip chart recorder 24.

There is always a possibility that the subject will move the non-verging eye and there is a slight tendency to move the non-verging eye horizontally during testing. Any motion of the eye might appear as an artifact in the accommodation recording on the strip chart recorder. Such motion is detected by a second photomultiplier 16 which is also an Amperex 150 CVP electrical photomultiplier.

Photomultiplier 16 and filter 15 are positioned in front of the viewing eye approximately 4 centimeters and slightly below the optical axis to detect reflection from area 43 on the cornea. Thus, as the cornea moves, corneal reflection of the slit beam 13 is intercepted by photomultiplier 16. However, the reflection from the cornea is first passed through a filter 15 which is preferably concentric to an arc of the cornea in a horizontal plane through the center of the cornea. The filter has an optical density which varies linearly through the concentric arc left to right as shown in FIG. 2. For example, the filter has a density varying uniformly from one log unit at the left side to two log units at the right side.

The photomultiplier 16 is preferably calibrated by first asking the individual to move his eye ±1° in the horizontal plane and then adjusting the gain in the electric circuit of the photomultiplier 16 so that there is no output with in ±1° of eye movement. However, if the eye rotates more than ±1°, there will be an output signal from the photomultiplier 16 which can be recorded. In this way, small angular horizontal eye movements result in photomultiplier 16 output current phoportional to the angle of rotation. The signal obtained is subtracted from the accommodative signal obtained from photomultiplier 23 by means of operational amplifiers preferably before accommodation is recorded on the strip chart recorder 24. Normally viewing eye movements encompassing the whole target field which may be ±0.573°, results in accommodation artifacts of less than 0.05 diopter.

Figure 6:
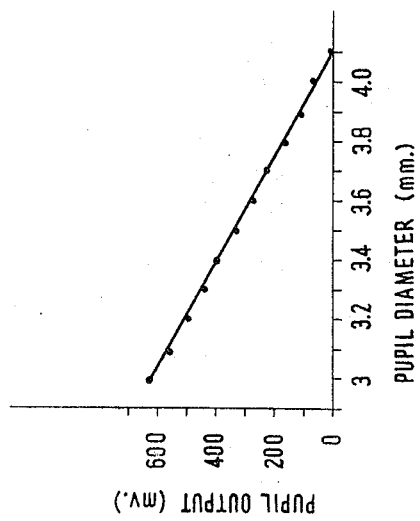
FIG. 6 is a graph showing a calibration curve for pupil diameter.

Turning now to the pupil diameter detector portion of the optical status tester of this invention, the pupil diameter of the viewing eye is detected by an infra-red sensitive photodiode such as a Texas Instruments LS-400 photodiode 44. The photodiode 44 is aligned with the infra-red slit beam reflection from the subject's iris. The vertical length of this reflection (from pupil margin to the sclera) indicated at 44' in FIG. 3 varies linearly with the pupil diameter. Therefore, the amount of reflected light is proportional to the pupil diameter since the slit beam has a fixed width. The resistance of the diode is a linear function of the incident light intensity so that when it is used as the feedback resistance of an operational amplifier such as a Philbrick P65-AU (not shown), output becomes proportional to the light incident on the diode and therefore proportional to pupil diameter. To calibrate the pupil diameter detector, a graduated ocular lens was placed in the slit lamp microscope and the subject's pupil diameter of the viewing eye was measured for pupil sizes corresponding to stimuli of the target in the 3 to 9.5 diopter range. The amplifier output voltage was simultaneously recorded on a strip chart recorder. The calibration curve is shown in FIG. 6. FIG. 7 indicates pupillary and accommodative responses to a square wave change in target stimulus diopters.

A consensual vergence detector portion of the instrument 10, to detect consensual vergence stimulated by accommodation, is formed by the pair of light sensitive diodes 20–21 which may be Texas Instruments LS-400 photodiodes arranged slightly below the optical axis of the verging eye. The diodes 20–21 are aimed at the iris-sclera border which is flooded with infra-red radiation as through a Kodak 89B Wratten filter from a source 19 on the optical axis of the consensual or verging eye of the individual. Similar to the pupil diameter detecting diode 44, the resistance of diodes 20 and 21 depends linearly on the light intensity that they intercept. Each diode forms one arm of a resistance bridge (not shown) whose null is detected by a differential amplifier (not shown). As the consensual eye converges, the amount of light intercepted in the nasal diode 21 decreases because of the lower reflection of the iris while the temperal diode 22 intercepts more light reflected from the sclera entering its light radiation receiving pattern. The amplifier output is then proportional to the angular rotation of the converging eye in a horizontal plane. When the eye diverges, opposite light patterns are intercepted. 0° vergence corresponds to the subject looking at optical infinity while convergence, or nasalward rotations of the verging eye are measured as positive values. FIG. 8 is a calibration curve for the vergence detector. The subject focused on 5 degree graduations from 0 to 30 degrees located one meter from his consensual eye and in the plane of the horizontal eye movements. The bridge amplifier output was recorded simultaneously on a strip chart recorder 24. In the preferred embodiment, the light source 19 was an infra-red light source having a wavelength of 8000 A.

FIGS. 9 and 10 are the results of a study of the interaction of the three physical systems stimulated and tested by the optical status tester of this invention. Diopter steps were presented to the subject by moving the target along the optical axis 18 and three channels of the monitor are measured in real time simultaneously and averaged. The starting time of the step stimuli ($t=0$) in each case was made arbitrary so that the subject being tested could not predict the onset of the diopter steps of target movement but only knew in which direction the movement would proceed. In both cases shown in FIGS. 9 and 10, each response of 20 samples were averaged simultaneously. FIG. 9 shows the average response of lens accommodation, pupil diameter change and consensual convergence to a target stimulus moving from 5 to 8 diopter positions along the optical axis while FIG. 10 indicates the average responses going from 8 to 5 diopters.

The latency of responses, that is, the delay in response to reaction to the stimulus can be important for determining physiological abnormalities in an individual. For example, as shown in FIGS. 9 and 10, the latency differences for positive and negative stimuli can be calculated. Moreover, the latency differences between each response can be calculated as for example, it can be noted that the convergence response has a latency which is only half that of the pupil response and 60% of that of the lens accommodation response.

A correlation between the target position and the signal output from photomultiplier 23 can be used to determine the power of a corrective lens if any needed by a subject, by maintaining the target in a fixed position and determining how much lens accommodation is present in the viewing eye. The well-known AC/A ratio can easily be determined by use of the electrical output of the differential amplifier of diodes 20 and 21 indicating AC (convergence) over the electrical output of photomultiplier 23 (lens accommodation).

While a specific embodiment of this invention has been shown and described, it should be understood that many variations are possible. For example, the particular light sensitive detectors used can vary greatly. Thus, the photomultipliers and photodiodes can be replaced with any light sensitive detectors giving a signal capable of being recorded. For example, solid state and vacuum devices such as photomultipliers and photodiodes are interchangeable. TV cameras can be used as detectors with the signals visually read out or electrically transcribed onto chart recorders. TV read-out can be beneficial as for example when photomultiplier 23 measures accommodation response which may be caused by both a change in degree of curvature of the eye lens and displacement of the eye lens in response to a stimulus along the optical axis. However, the TV camera may enable one to separate the response caused by displacement as opposed to the response caused by change in the curvature of the lens.

The supplementary lens 17 can have higher or lower power than 10 diopters, but, in all cases, the focal length of the lens 17 is equal to the distance between it and the front surface of the viewing eye.

The specific distances mentioned can vary depending upon the intensity of light as can the particular components used. While it is preferred to use a binocular microscope so that one ocular can be used with visible light to align the system with a selected portion of the eye to be illuminated, a single ocular microscope or lens system can be used. While a 2-channel recorder has been described, multi-channel recorders of various types can be used so long as the signals obtained are measured in real time and can thus be correlated.

Preferably testing by the means and method of this invention is carried out in a dark room with the only light being that obtained from 19, 13 and the target. However, visible light can be present in the testing area if desired. Moreover, while the light sources 13 and 19 are preferably infra-red sources, visible light can be used for these sources if desired.

It is obvious that the instrument can be extended to include light sensitive detectors 16, 23 and 44 as well as light sources such as 13 for both eyes to test both eyes for accommodation and pupil diameter changes simultaneously. In some embodiments of the invention, it may be desirable to eliminate pupil diameter detector and/or consensual vergence detector system where lens accommodation is the only measurement of interest.

While the specific consensual vergence system comprising elements 19, 20 and 21 is preferred for use in this invention, other means for measurement of the rotation of the consensual eye can be used. For example, a photomultiplier and filter such as 16 and 15 can be used in conjunction with a second slit beam light source to measure consensual eye rotation.

What is claimed is:

1. A method of determining eye accommodation of an individual and related data comprising,
   positioning a target stimulus on the optical axis of a viewing eye of the individual,
   directing a slit beam of light onto the cornea, front surface and interior of the lens of said eye to be tested while said eye is focused on said target,
   positioning a supplementary lens intermediate said target and said eye with said supplementary lens having a focal length equal to the distance between said supplementary lens and the front surface of said eye,
   moving said target along said optical axis while continuously measuring the amount of light reflected from said eye lens which is proportional to accommodative change of said lens for a stimulus diopter range,
   and measuring reflection of light from the cornea of said eye through a variable optical density filter to obtain a correction in reflected light from said eye lens due to movement of the eye about a horizontal plane, and electrically correcting said amount of light reflected from said eye lens in accordance with the value obtained.

2. A method in accordance with the method of claim 1 and further comprising measuring the amount of light from said slit beam reflected from said eye at the iris simultaneously with detection of light from said eye lens and cornea in response to said target position and obtaining measurements of pupil diameter of said eye corresponding to eye accommodation at any given time while carrying out said method.

3. A method in accordance with the method of claim 2 and further comprising monitoring rotation in a horizontal plane of the consensual eye of said individual simultaneously with measuring the amount of reflected light from said eye lens, cornea and iris.

4. A method in accordance with the method of claim 1 and further comprising monitoring rotation in a horizontal plane of the consensual eye of said individual simultaneously with measuring the amount of reflected light from said eye lens and cornea.

5. An optical status testing means for determining eye accommodation and relate data comprising,
   means for directing a slit beam of light onto the front surface of a viewing eye of an individual,
   a target for alignment with the optical axis of said viewing eye and mounted for movement along said axis,
   light sensitive means positioned for continuously determining reflection of said light from the eye lens of said individual at varying distances of said target from said eye whereby the eye lens accommodation of said eye is measured,
   a supplementary lens interposed between said target and the front surface of said eye with said supplementary lens being spaced from said eye a distance corresponding to the focal length of said supplementary lens,
   and a second light sensitive means positioned to measure a portion of said light reflected from the cornea of the eye for monitoring horizontal movement of said eye simultaneously with said determining of reflection of said light from said eye lens.

6. An optical status testing means in accordance with claim 5 and further comprising means for determining the horizontal degree of rotation of a consensual eye of the individual being tested in response to position of said target simultaneously with measurement of light reflection by said first and second light sensitive means.

7. An optical status testing means in accordance with claim 5 wherein electrical signals are obtained from said first and second light sensitive means and means are provided for recording said signals in real time.

8. An optical status testing means for determining eye accommodation and related data comprising,
   means for directing a slit beam of light onto the front surface of a viewing eye of an individual,
   a target for alignment with the optical axis of said viewing eye and mounted for movement along said axis,
   light sensitive means for continuously determining reflection of said light from the eye lens of said individual at varying distances of said target from said eye whereby the eye lens accommodation of said eye is measured,
   a supplementary lens interposed between said target and the front surface of said eye with said supplementary lens being spaced from said eye a distance corresponding to the focal length of said supplementary lens,
   a second light sensitive means positioned below the optical axis of said eye for measuring a portion of said light reflected from the cornea of said eye,
   a filter positioned between said second light sensitive means and said eye,
   said filter having varying optical density from side to side thereof so that movement of said eye in a horizontal plane will permit increasing or decreasing amounts of light to be reflected to said second light sensitive means so that correction can be made for said movement in said measuring of said eye lens accommodation.

9. An optical status testing means in accordance with claim 8 and further including a third light sensitive means for detecting reflection of light from the iris of said eye and giving an electrical response in direct linear relationship to the pupil diameter of said eye.

10. An optical status testing means in accordance with claim 9 wherein said first, second and third light sensitive means are mounted for simultaneous operation,
and means for continuously recording responses from said first, second and third light sensitive means at simultaneous time periods.

11. An optical status testing means in accordance with claim 10 and further including means for determining the horizontal degree of rotation of a consensual eye of the individual being tested in response to position of said target simultaneously with measurement of light reflection by said first, second and third light sensitive means.

12. An optical status testing means in accordance with claim 8 and further including means for determining the horizontal degree of rotation of a consensual eye of the individual being tested in response to position of the target simultaneously with measurement of light reflection by said first and second light sensitive means.

13. An optical status testing means in accordance with claim 11 wherein said light is infra-red light.

14. An optical status tester in accordance with claim 13 wherein a diaphragm is positioned between said first light sensitive means and said eye.

15. A method of determining eye accommodation of an individual and related data comprising,
positioning a target stimulus on the optic axis of a viewing eye of the individual,
directing a slit beam of light onto the cornea, front surface and interior of the lens of said eye to be tested while said eye is focused on said target,
positioning a supplementary lens intermediate said target and said eye with said supplementary lens having a focal length equal to the distance between said supplementary lens and the front surface of said eye,
said slit beam of light being directed to the eye at an angle to said optical axis without passing through said supplementary lens,
moving said target stimulus along said optic axis, and
measuring the amount of light reflected from said lens which is proportional to accommodative change of said lens for a stimulus diopter range.

16. A method in accordance with the method of claim 15 and further comprising simultaneously with said measuring, carrying out a second measuring step to measure reflection of light from the cornea of said eye to obtain a correction in reflected light from said eye lens due to movement of said eye about a horizontal plane.

17. A method in accordance with the method of claim 16 and further comprising moving said target along said optical axis while continuously measuring the amount of light reflected from said eye lens which is proportional to accommodative change of said lens for a stimulus diopter range.

18. A method in accordance with the method of claim 16 and further comprising measuring the amount of light from said slit beam reflected from said eye at the iris simultaneously with detection of light from said eye lens and cornea in response to said target position and obtaining measurements of pupil diameter of said eye corresponding to eye accommodation at any given time while carrying out said method.

19. A method in accordance with the method of claim 18 and further comprising monitoring rotation in a horizontal plane of the consensual eye of said individual simultaneously with measuring the amount of reflected light from said eye lens, cornea and iris.

20. A method of determining eye accommodation of an individual, said method comprising,
positioning a target stimulus on the optical axis of a viewing eye of the individual,
directing a slit beam of light at an angle to said optical axis onto the cornea, front surface and interior of the lens of said eye to be tested while said eye is focused on said target,
moving said target stimulus along said optic axis, and
measuring the amount of light reflected from said lens which is proportional to accommodative change of said lens for a stimulus diopter range.

21. An optical status testing means for determining eye accommodation of an individual comprising,
means mounted for alignment of a target stimulus with the optical axis of a viewing eye and for moving said target stimulus along said optical axis,
means for directing a slit beam of light on an angle to said optical axis onto the cornea, front surface and interior of the lens of said eye to be tested while said eye is focused on said target, and
light sensitive means positioned for continuously measuring reflection of said light from the eye lens of said individual at varying distances of said target from said eye whereby the eye lens accommodation of said eye is measured.

References Cited
UNITED STATES PATENTS

| | | | |
|---|---|---|---|
| 2,107,305 | 2/1938 | Ogle | 351—3 X |
| 2,385,503 | 9/1945 | Glasser | 351—1 X |
| 2,445,787 | 7/1948 | Lilienfeld | 351—7 |
| 2,573,464 | 10/1951 | Lowenstein et al. | 351—6 X |
| 2,964,644 | 12/1960 | Hobrough. | |
| 3,036,568 | 5/1962 | Stark. | |
| 3,379,885 | 4/1968 | Nork. | |
| 3,462,604 | 8/1969 | Mason. | |

OTHER REFERENCES

Bausch & Lomb, Thorpe Slit Lamp Pamphlet (1957).

Allen: "The Influence of Age on the Speed of Accomodations," Amer. J. of Opt. and Arch. of Am. Acad. of Ophth., vol. 33, No. 4, 1956.

Warshawsky, J.: "High Res. Opt. Cont. Mens., Accom.," JOSA, vol. 54, No. 3, pp. 375–379.

Lowenstein et al.: "Electronic Pupillography," Archin. of Ophthalmology, vol. 59, pp. 352–362 March 1958.

DAVID SCHONBERG, Primary Examiner

P. A. SACHER, Assistant Examiner

U.S. Cl. X.R.

351—7, 13, 14, 16, 39